W. FERRIS.
EXCAVATOR.
APPLICATION FILED FEB. 15, 1915.
1,197,195.
Patented Sept. 5, 1916.
2 SHEETS—SHEET 2.
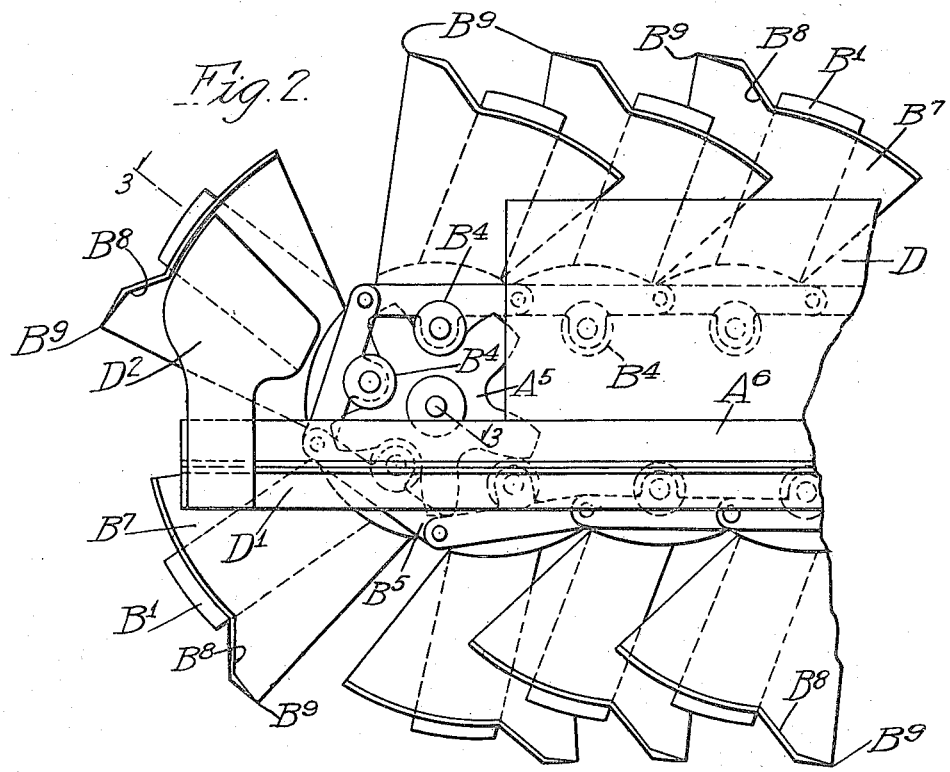
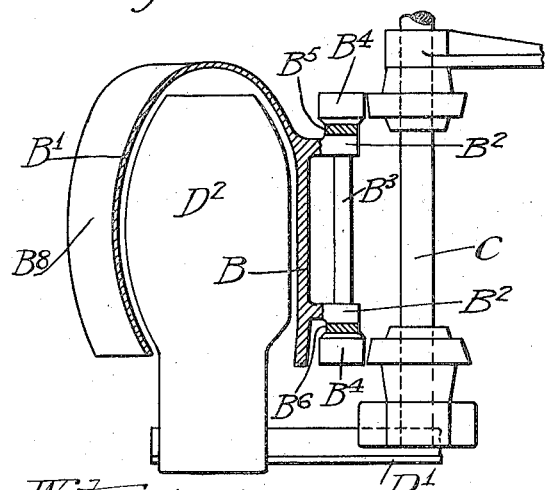
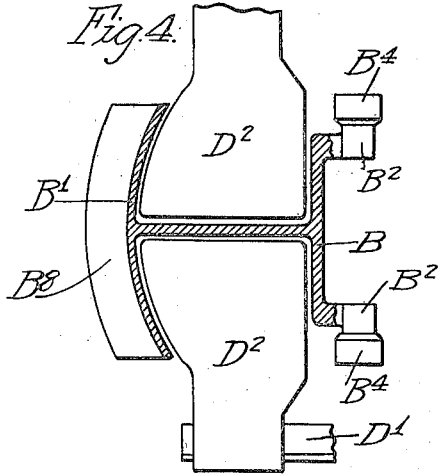
Inventor:
Walter Ferris.

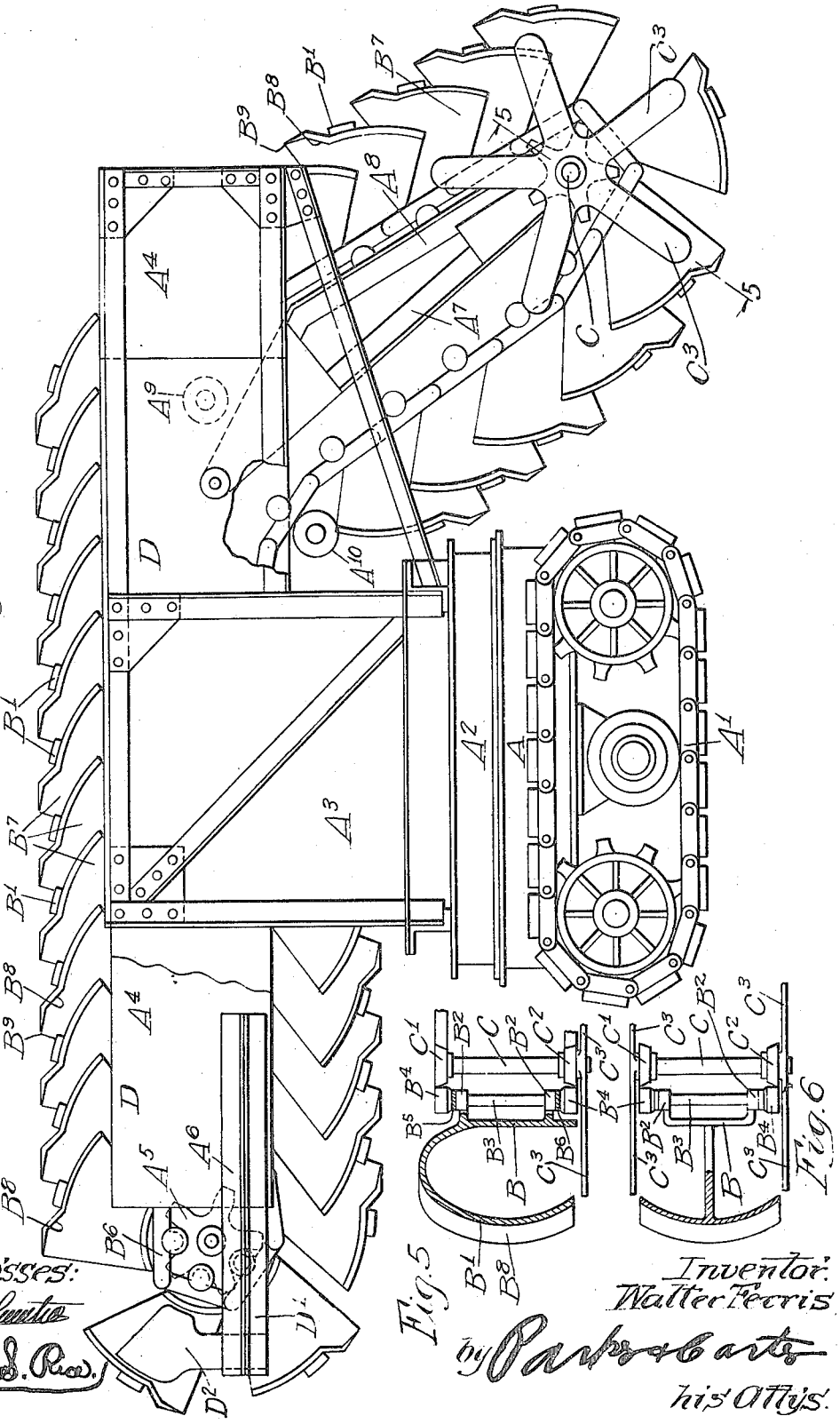

UNITED STATES PATENT OFFICE.

WALTER FERRIS, OF MILWAUKEE, WISCONSIN, ASSIGNOR TO BUCYRUS COMPANY, OF SOUTH MILWAUKEE, WISCONSIN, A CORPORATION OF WISCONSIN.

EXCAVATOR.

1,197,195.  Specification of Letters Patent.  Patented Sept. 5, 1916.

Application filed February 15, 1915. Serial No. 8,179.

*To all whom it may concern:*

Be it known that I, WALTER FERRIS, a citizen of the United States, residing at Milwaukee, in the county of Milwaukee and State of Wisconsin, have invented a certain new and useful Improvement in Excavators, of which the following is a specification.

My invention relates to improvements in excavating machines and has for one object an excavating machine which will conveniently and satisfactorily excavate sticky and adhesive material, and to this end I provide means for positively unloading or ejecting the material from the excavating bucket when the bucket reaches the appropriate dumping point. In my invention, therefore, I provide means for continuously excavating sticky or clay-like material. These means pick up successive loads of material and carry them along continuously to the discharge point, and there those successive loads of material are positively unloaded one at a time in rapid succession without delay or hindrance by a positive unloading means which in my preferred form I have illustrated as a fixed plow past which the unloading buckets are successively conveyed, and which plow is enabled to enter the successive buckets and plow the material out.

One object of my invention is therefore to provide a bucket which may be positively unloaded, and from which the material may be positively ejected by means of an unloading device without interfering with the movement of the bucket or the continuous operation of the excavating machine.

Other objects of my invention will appear from time to time in the discussion.

My invention is illustrated more or less diagrammatically in the accompanying drawings, wherein—

Figure 1 is a side elevation of my machine. Fig. 2 a detail side elevation on an enlarged scale, showing the dumping end. Fig. 3 a section on the line 3—3 of Fig. 2. Fig. 4 a similar section showing a modified form of bucket and unloading plows. Fig. 5 a section on the line 5—5 of Fig. 1. Fig. 6 a similar section showing the modified form of unloading bucket illustrated in Fig. 4.

Like parts are indicated by like letters throughout the several figures.

A is a platform supported on an endless track chain truck $A^1$, and carrying a turn table $A^2$.

$A^3$ is a housing mounted on the turn table $A^2$ to contain operating mechanism not shown.

$A^4$ is a horizontal bucket guide and supporting girder having at its rear end a driving sprocket $A^5$, and carrying the support $A^6$.

$A^7$ is a rotatably mounted adjustable excavator boom having on its upper surface a guide track $A^8$.

$A^9$ is a guide wheel mounted on the girder $A^4$ adjacent the boom $A^7$ to guide the buckets as they leave the boom.

$A^{10}$ are two similar guide pulleys mounted on short studs projecting inwardly from side members of girder $A^4$ to guide the buckets on the return movement to the excavating point.

The means for driving the bucket chain is not here shown, as it forms no part of my invention, but it is of course contained within the housing $A^3$.

The bucket or excavating chain is made up of a series of buckets coupled one to the other and more or less interlocked as indicated, and a description of one bucket will suffice for the description of all.

B is a rigid bucket base carrying an integral upwardly extending curved arm or yoke $B^1$ attached to the base at one side, but leaving an opening as indicated on the opposed side.

$B^2$, $B^2$, are lugs downwardly extending from the base B to engage the bucket axle $B^3$ which carries the rollers $B^4$, $B^4$. The bucket base, it will be noted, has forward and rearward extensions $B^5$, $B^6$, to form a chain link. These links are of course pivoted each to the link supporting the adjacent bucket.

$B^7$ is the bucket body made up preferably of lighter material, and is supported by and rigidly attached to the base B and yoke $B^1$. The forward part of the bucket is expanded as at $B^8$, and has a cutting lip or edge which projects beyond the yoke $B^1$ and body of the bucket a sufficient distance to give ample cutting clearance. It will be noted that the bucket portion projects rearwardly from the yoke $B^1$ extending into the next bucket behind so as to form when traveling in a straight line along the track, overlapping buckets. These overlapping buckets form what is in effect a substantially continuous excavating tube or sleeve having one open side. This one open side is closed except at its extreme ends by the guide board D on the housing A, and in coöperation with the buckets, it forms a substantially continuous excavating tube or movable passage. The chain at its two ends, namely, at the excavating end at the end of the boom, and the dumping end at the rear end of the horizontal member, travels over the guide sprockets, and as the chain travels over these sprockets, the buckets separate so as to, for the time, discontinue or break up the tube into its component elements of successive separate excavating buckets. This action occurs in such a manner that, at the excavating end, each bucket is thrown rapidly forward as it comes around the sprocket, and is thus enabled to dig out a bucketful, independent of all the other buckets, and at the discharge end each bucket is constantly thrown forward away from the remainder of the buckets, so as to leave it free to discharge its own particular charge free from the influence of the other buckets. Thus, the buckets are filled at one end of the excursion, and unloaded at the other end.

Referring to Fig. 5, C is a guide sprocket shaft, which carries the guide sprockets C¹, C² in the lower end of the boom A⁷. The chain, of course, travels over this guide sprocket.

C³, C³, are cutting knives rigidly mounted on the shaft C for rotation with the guide sprocket. These knives operate at one side of, and in unison with the excavating buckets. Their function is to cut away the material so as to permit it to be easily carried by the bucket. The reason for these cutting knives is that the yoke and bucket can cut the clay away at the bottom and one side, but cannot cut it at the open side, and so it must either be cut by this knife or some other cutting means, or else torn away. Such tearing away of material would be very difficult owing to loss of power and friction and the like, and the knife is advantageous for this reason.

D² is an unloading plow. It is mounted on the frame D¹ extending rearwardly from the support A⁶, and projects inwardly through the open side of each bucket as it passes, and scrapes out or plows out or positively discharges from the bucket material therein contained. This material may, or may not stick to the plow. If it does stick to the plow, it would be pushed off by the load from the next succeeding bucket, otherwise it would drop off freely, and no harm would be done.

It will be evident that while I have shown in my drawings an operative device, still many changes might be made both in size, shape and arrangements of parts, without departing from the spirit of my invention, and I wish, therefore, that my drawings be regarded as in a sense diagrammatic.

It will be noted that after the buckets have made their cut, there is a short path along which they travel before the open side comes in line with the guide board on the housing. Experience shows that it is not necessary to close the buckets for a short distance. The material cannot fall out, partially because at such times, under ordinary circumstances, the bucket edges will be adjacent the cut, but more than that, because the problem is not how to keep the material in the bucket, but how to get it out. This machine is intended for use with clay and other sticky substances, and these substances stick very closely to the walls of the buckets. For this reason a scraping plow is needed to dislodge it.

The modification shown in Fig. 6 is exactly the same as that shown in Fig. 5 except that the bucket is divided by a central partition and has both sides open, and is provided with cutting knives on either side, in this case, the discharge being of course in opposite directions from the two sides of the bucket.

By the arrangement shown, the excavating buckets separate radially as they go around the head sprocket to excavate, thus making a wide excavating jaw or opening through which the material as it is cut off by the cutting lip, passes. As soon as the bucket swings around the curve and proceeds on its straight line path, it telescopes with the buckets in front and behind it to form what is in effect a continuous bucket. Being outwardly flared at its front to carry, the cutting lip overlies the holding yoke of the bucket in front of it, and no interference takes place. The material may possibly be more or less compressed or compacted, but if this compression does not become too great, no particular harm is done for the long path back in a horizontal plane would discharge where the chain is likely to sag and vibrate more or less. The side flare is put on, not because material would undoubtedly fall out, but in order to make assurance doubly sure, and to prevent any possible jarring loose of the material. Thus the unloading is concentrated at the discharge end.

I claim:

1. An excavating machine comprising a chain, a series of buckets having open sides carried thereby, a guide sprocket for said chain at the excavating end, and cutting knives carried by said sprocket substantially in a line with the open sides of the bucket.

2. In an excavating machine a bucket having an open side, and means independent of the bucket for cutting away the material adjacent said open side when the bucket is excavating, said means being located in a plane bounding the open side of the bucket while in the excavating position.

3. In an excavating machine a bucket having an open side, and means independent of the bucket for cutting away the material adjacent said open side when the bucket is excavating, said means comprising a knife mounted for movement in unison with the bucket, said means being located in a plane bounding the open side of the bucket while in the excavating position.

4. In an excavating machine a continuous driving bucket carrying chain, a series of buckets mounted thereupon open front and rear, and at one side a sprocket about which the chain travels carrying the buckets, the buckets being each one separate from all the remainder, and connected together in operative relation only by the chain which carries them, the forward end of each bucket being larger than the rear end of the adjacent bucket, the buckets being positioned on the chain so that as they travel about the sprocket, their cutting edges project outwardly to make an excavating cut, their relation being such that as the chain travels along a straight line away from the sprocket, the buckets telescope with the rear end of one bucket within the open forward end of the other to form a continuous open sided channel.

In testimony whereof, I affix my signature in the presence of two witnesses this 11th day of February 1915.

WALTER FERRIS.

Witnesses:
G. F. KENT,
H. CUMMINGS.